United States Patent
Naegle et al.

(10) Patent No.: US 10,243,955 B2
(45) Date of Patent: Mar. 26, 2019

(54) SECURELY ESTABLISHING TIME VALUES AT CONNECTED DEVICES

(71) Applicant: GM Global Technology Operations LLC, Detroit, MI (US)

(72) Inventors: Andrew Naegle, Lake Orion, MI (US); Karl B. Leboeuf, Lasalle (CA)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 15/210,492

(22) Filed: Jul. 14, 2016

(65) Prior Publication Data

US 2018/0019999 A1 Jan. 18, 2018

(51) Int. Cl.
*H04L 29/06* (2006.01)
*H04W 88/02* (2009.01)
*H04W 12/10* (2009.01)

(52) U.S. Cl.
CPC ...... *H04L 63/0876* (2013.01); *H04L 63/0492* (2013.01); *H04L 63/0823* (2013.01); *H04L 63/123* (2013.01); *H04W 12/10* (2013.01); *H04W 88/02* (2013.01)

(58) Field of Classification Search
CPC ............... H04L 63/0876; H04L 63/123; H04L 63/0492; H04L 63/0823; H04W 12/10; H04W 88/02
See application file for complete search history.

(56) References Cited

U.S. PATENT DOCUMENTS

| | | | | |
|---|---|---|---|---|
| 7,478,173 B1* | 1/2009 | Delco | ................. | H04L 12/2865 |
| | | | | 709/250 |
| 7,500,099 B1* | 3/2009 | McElwee | .............. | H04L 9/3236 |
| | | | | 713/168 |
| 9,106,405 B1* | 8/2015 | Roth | ......................... | H04L 9/08 |
| 9,621,347 B2* | 4/2017 | Leighton | .................. | H04L 9/30 |
| 2003/0159029 A1* | 8/2003 | Brown | ............. | G07B 17/00193 |
| | | | | 713/151 |
| 2003/0163685 A1* | 8/2003 | Paatero | ................. | H04L 9/3263 |
| | | | | 713/155 |
| 2004/0003252 A1* | 1/2004 | Dabbish | .................. | B60R 25/04 |
| | | | | 713/175 |
| 2004/0162787 A1* | 8/2004 | Madison | ................. | G06F 21/10 |
| | | | | 705/64 |
| 2007/0067833 A1* | 3/2007 | Colnot | .................. | H04L 9/3271 |
| | | | | 726/9 |

(Continued)

OTHER PUBLICATIONS

Xia et al. "Defending against VM Rollback Attack." IEEE/IFIP International Conference on Dependable Systems and Networks Workshops, Jun. 2012, 5 pages.

*Primary Examiner* — John B King
(74) *Attorney, Agent, or Firm* — David Willoughby; Reising Ethington P.C.

(57) ABSTRACT

A system and method of establishing a secure time value in a connected device. The method includes: receiving a hash of a pinset at the connected device from each independent time server in a federation, wherein the pinset is stored at the connected device as well as at the independent time servers remotely located from the connected device; receiving at the connected device a time value along with each hash of the pinset; attempting to verify the hashes of the pinset received from each of the plurality of independent time servers at the connected device; and determining at the connected device which time values received from the plurality of independent time servers are valid based on validity of the hashes.

18 Claims, 3 Drawing Sheets

(56) References Cited

U.S. PATENT DOCUMENTS

| | | | |
|---|---|---|---|
| 2008/0104401 A1* | 5/2008 | Miyamoto | H04L 9/3247 713/175 |
| 2008/0163361 A1* | 7/2008 | Davis | G06F 21/31 726/19 |
| 2008/0195869 A1* | 8/2008 | Kim | G06F 21/10 713/178 |
| 2009/0044010 A1* | 2/2009 | Hughes | G06F 21/64 713/165 |
| 2010/0010775 A1* | 1/2010 | Ohkubo | G04F 10/00 702/178 |
| 2010/0049984 A1* | 2/2010 | Masushio | H04L 63/0853 713/179 |
| 2011/0066603 A1* | 3/2011 | Thorup | G06F 17/3033 707/696 |
| 2011/0184910 A1* | 7/2011 | Love | G06F 17/30551 707/610 |
| 2011/0271330 A1* | 11/2011 | Zhang | H04L 63/0838 726/5 |
| 2012/0066500 A1* | 3/2012 | Ananthasubramanian | H04L 9/0825 713/171 |
| 2012/0144203 A1* | 6/2012 | Albisu | G06F 21/35 713/184 |
| 2014/0157425 A1* | 6/2014 | Saremi | H04L 63/12 726/26 |
| 2014/0281567 A1* | 9/2014 | Rane | G06F 21/32 713/186 |
| 2014/0351596 A1* | 11/2014 | Chan | H04L 63/08 713/170 |
| 2015/0113587 A1* | 4/2015 | Gautam | G06F 21/57 726/1 |
| 2015/0195280 A1* | 7/2015 | Toyonaga | H04L 63/123 713/155 |
| 2015/0302186 A1* | 10/2015 | Suzuki | G06F 21/31 726/17 |
| 2016/0043865 A1* | 2/2016 | Matsakis | H04L 63/0428 713/168 |
| 2016/0065589 A1* | 3/2016 | Leighton | G06F 9/45558 726/4 |
| 2016/0191473 A1* | 6/2016 | De Wasch | H04L 63/126 713/171 |
| 2016/0248748 A1* | 8/2016 | Caterino | H04L 63/08 |
| 2017/0170970 A1* | 6/2017 | Leighton | H04L 9/3247 |

* cited by examiner

SECURELY ESTABLISHING TIME VALUES AT CONNECTED DEVICES

TECHNICAL FIELD

The present invention relates to connected devices and, more particularly, to securely establishing a time value at a connected device.

BACKGROUND

Connected devices are increasingly reliant on internal time values to successfully carry out or regulate a variety of activities. The connected device may permit a person to carry out a particular device-related activity during a temporal window that the device monitors using an internal time value. As long as the current time value falls within the temporal window, the connected device will allow the activity to occur. However, when the internal time value indicates that the temporal window has expired, the connected device can stop allowing the activity.

In a temporally-based access system, a temptation exists to manipulate the internal time value of the connected device thereby allowing access outside of a defined temporal window. Sometimes, connected devices can be tricked into changing their internal time values in a way that a temporal window is always valid or never valid or such that the temporal window can be made valid in response to an unauthorized change to the internal time value of the connected device. While accurate time values can be obtained from signals broadcast by one or more GPS satellites, these time values may be susceptible to manipulation. The signals broadcast by the GPS satellites are not digitally signed or authenticated and a connected device relying on these signals to obtain a valid time can be fooled into receiving a maliciously-generated signal intended to mimic a GPS signal that includes a different time. It would be helpful to maintain an accurate time value at the connected device, but updates or modifications to the time value should be resistant to tampering or manipulation.

SUMMARY

According to an embodiment of the invention, there is provided a method of establishing a secure time value in a connected device. The method includes receiving a hash of a pinset at the connected device from each independent time server in a federation, wherein the pinset is stored at the connected device as well as at the independent time servers remotely located from the connected device; receiving at the connected device a time value along with each hash of the pinset; attempting to verify the hashes of the pinset received from each of the plurality of independent time servers at the connected device; and determining at the connected device which time values received from the plurality of independent time servers are valid based on validity of the hashes.

According to another embodiment of the invention, there is provided a method of establishing a secure time value in a connected device. The method includes receiving a time value and a hash of a pinset at the connected device from each of three or more independent time servers that are remotely located from the connected device; attempting, at the connected device, to validate the digital certificates included with the received hashes; determining how many of the digital certificates are valid; determining whether to establish the secure time value using the received time values based on how many of the digital certificates are valid; and establishing the secure time value at the connected device using the time values.

According to yet another embodiment of the invention, there is provided a method of establishing a secure time value in a connected device. The method includes wirelessly receiving a time value at the connected device from a source located remote from the connected device; determining if the received time value is earlier than a current time value maintained at the connected device; rejecting the received time value when the received time value is determined to be earlier than the current time value maintained at the connected device; and replacing the current time value maintained at the connected device with the received time value when the received time value is determined to be the same as or later than the current time value maintained at the connected device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below establishes a secure time value in a connected device. The method assures the security or authenticity of a time value received at the connected device from a plurality of remotely-located independent time servers. The connected device and the independent time servers can each maintain digital certificates that are issued by a trusted source and a list of the independent time servers also called a pinset. As part of providing a time value to the connected device, the independent time servers can include one of the digital certificates and a copy of the pinset to the connected device. The pinset can include a list of the independent time servers included in a federation that the connected device receives time values from along with one or more digital certificates. The digital certificates used by the connected device and the independent time servers can be communicated between the connected device and independent time servers using a communication protocol, such as Transport Layer Security (TLS), and verified to be authentic. TLS is an end-to-end communication protocol that is normally configured to provide authentication, message integrity, and confidentiality. Use of the digital certificates and the pinset maintained at both the connected device and the independent time servers can help facilitate trusted time values, which are a prerequisite for trusting different digital certificates the connected device may receive having a time-based expiration value. When the current time value is trusted, the connected device can confidently authenticate other digital certificates.

The connected device may seek to update or confirm the time value it maintains by wirelessly transmitting a time value request to the plurality of independent time servers.

The connected device can receive a response from each of the independent time servers that includes a time value, a digital certificate, and a pinset. The connected device can validate the received pinset thereby validating the time value sent with the pinset. The term pinset can also refer to a hash of the pinset that can be used to conserve data transmission resources. The connected device can identify how many of the independent time servers are valid based on the pinset or pinset hash each independent time server provided before accepting the time values provided by the independent time servers. If the number of valid time independent time servers is above a particular threshold, the connected device can determine that the time values provided by those independent time servers is valid; otherwise, the connected device can reject the time values.

Maintaining a trusted or secure time in a connected device can prevent the use of temporally expired or indefinite digital certificates with the connected device. Digital certificates that are expired or indefinite involve a number of drawbacks. For instance, these digital certificates may not be associated with a protected private key, the certificate authority may no longer issue revocation requests, and cryptography standards used with older digital certificates may be vulnerable to attack. A secure time can ensure that the connected device does not have to rely on expired/indefinite digital certificates.

The plurality of independent time servers can act as a federation such that they are collectively used by an independent monitoring client in order to verify that the time values the plurality of independent time servers provide are accurate. While the following disclosure describes an implementation in which the connected device takes the form of a vehicle telematics unit maintaining a time value and securely updating that time value using the federation of independent time servers, it should be understood that the method of establishing a secure time value can be implemented using other types of connected devices that can be wired, such as a fixed computer (PC), or wireless, such as a smart phone.

Communications System—

Figure 1:
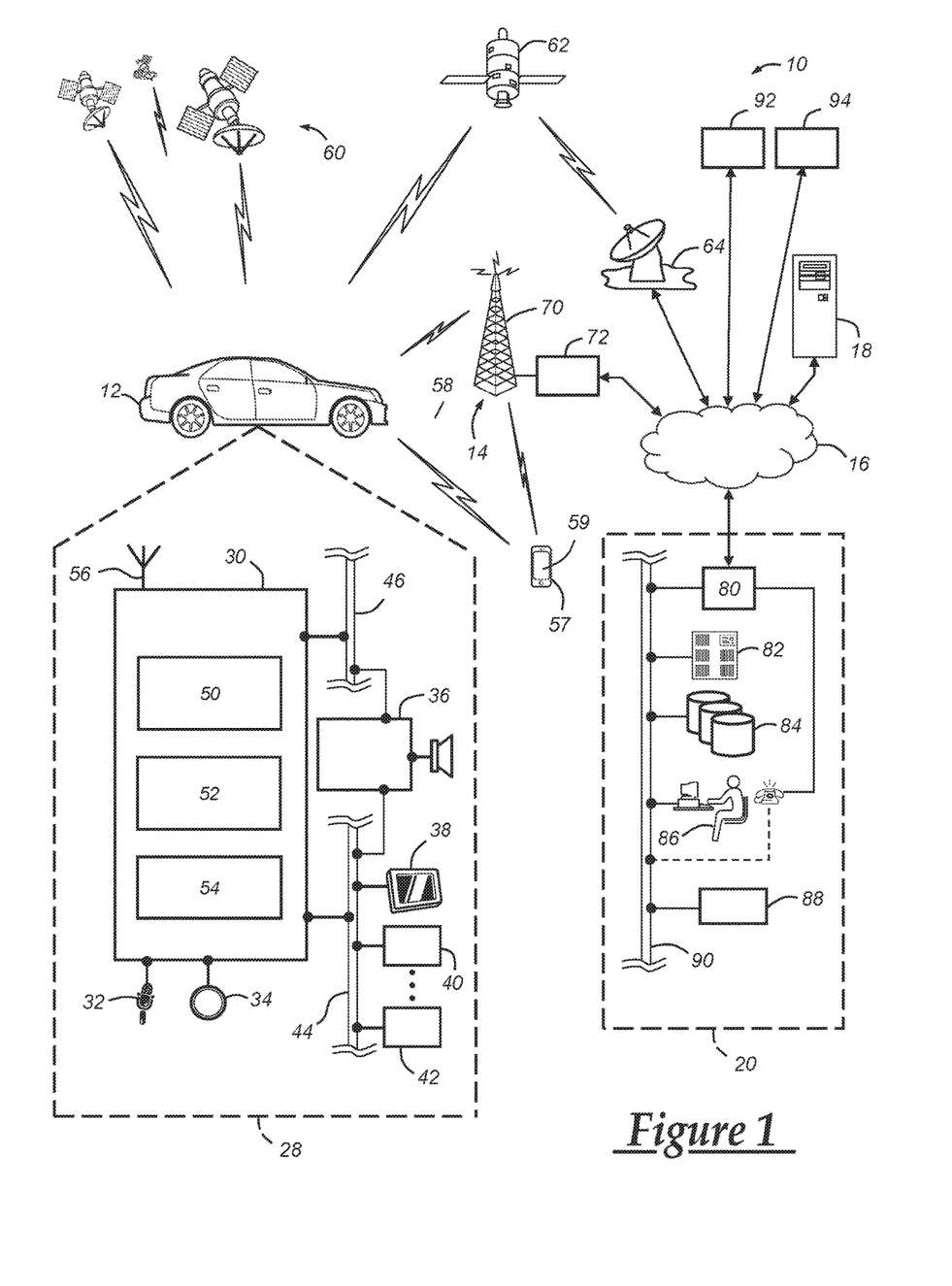
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LIE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the WEE 802.11 protocols, WiMAX, ZigBee™, Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

One of the networked devices that can communicate with the telematics unit 30 is a connected device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. The smart phone 57 also includes one or more microprocessors that execute machine code to generate logical output. Examples of the smart phone 57 include the iPhone manufactured by Apple and the Galaxy manufactured by Samsung, as well as others. The smart phone 57 also has the ability to communicate via short-range wireless communication protocols, such as Bluetooth and Wi-Fi. While the smart phone 57 may include the ability to communicate via cellular communications using the wireless carrier system 14, this is not always the case. For instance, Apple manufactures devices such as the various models of the iPad and iPod Touch that include the processing capability, the display 59, and the ability to communicate over a short-range wireless communication link. However, the iPod Touch™ and some iPads™ do not have cellular communication capabilities. Even so, these and other similar devices may be used or considered a type of connected device, such as the smart phone 57, for the purposes of the method described herein. As noted above, a personal computer (PC) or other similar computing device having access to the Internet could also implement the methods discussed.

In some implementations, the smart phone 57 can receive a digital certificate that permits access to the vehicle 12 for a defined temporal period. The temporal period can be established to be cotemporaneous with a validity period of the digital certificate that permits access to the vehicle 12. The vehicle telematics unit 30 can then receive the digital certificate relating to vehicle access from the smart phone 57 and determine whether or not the certificate is valid. To do so, the vehicle telematics unit 30 can compare the validity period of the digital certificate for vehicle access with a time value maintained at the vehicle 12. When the time value is within the validity period, the vehicle telematics unit 30 can validate the digital certificate that permits access and allow the smart phone user to access the vehicle 12. However, if the time value lies outside of the validity period, the vehicle telematics unit 30 can reject the digital certificate that permits access and deny access to the vehicle 12. Apart from using the smart phone 57 to access the vehicle 12 using digital certificates, the smart phone 57 can also implement the methods disclosed herein for establishing a secure or trusted time value within the smart phone 57.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein. The processor 52 can maintain an internal clock in the form of a 64 bit counter that maintains a time value. This time value can have a basis in epoch time and then be adjusted with the application of a modifier. Epoch time generally refers to a time value measured from Jan. 1, 1970. 32 bit counters can be used as well, but when used with an epoch time implementation can be expected to reset sometime during the year 2038. The epoch time can be advanced or retarded by the processor 52 in response to time values received at the vehicle 12 or other factors, such as the existence or passing of daylight savings time.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (OTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/CPRS (e.g., 4G LIE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BI A), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize \IRS 88 as an automated advisor or, a combination of YRS 88 and the live advisor 86 can be used.

A federation of independent time servers can be implemented as three or more computers that are remotely located from the connected device and configured to maintain a time value as well as a pinset for validating the time value to the connected device. Two independent time servers 92, 94 solely dedicated to acting as time servers are shown. The computers at independent time servers 92, 94 can include one or more microprocessors, memory devices, and input/output devices collectively capable of storing digital certificates and maintaining a time value. Like the processor 52, the independent time servers 92, 94 can each maintain a 64 bit counter that generates a value corresponding to epoch time. In addition, the independent time servers 92, 94 can receive one or more digital certificates and a list of all independent time servers in the federation. The digital certificate(s) and list can be stored in a memory device as a pinset. It should be appreciated that additional independent time servers can be used along with or instead of the independent time servers 92, 94. The independent time servers can be maintained at facilities that also carry out other activities. In one example, the computer 18, the call center 20, or both can maintain a time value and a pinset for validating the time value to the connected device. In such an arrangement, a federated group of time servers can be formed from independent time servers 92, 94 as well as the independent time servers maintained at the computer 18 and the call center 20. While this example involves four independent time servers, the number of servers can range from three to n servers. Maintaining separation of the independent time servers can help increase the amount of trust in the time values the federated group of time servers sends to vehicles.
Method—

Figure 2:
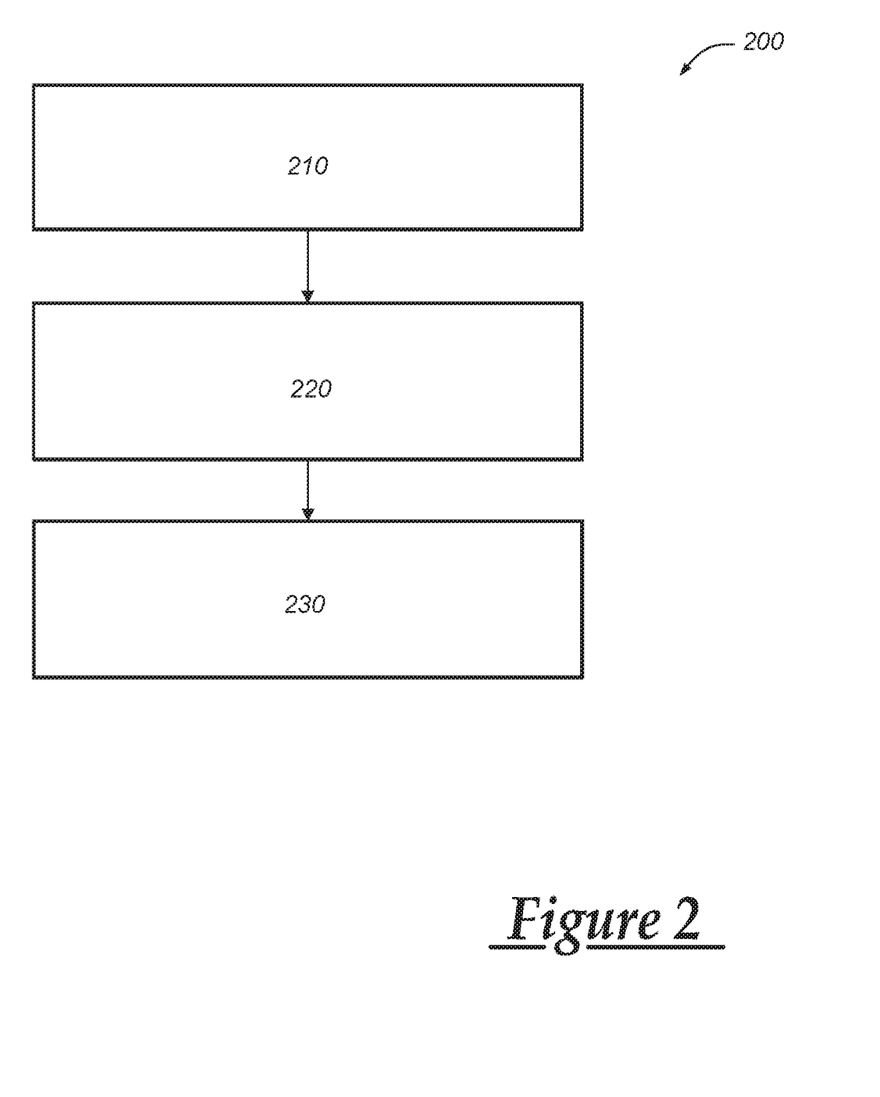
FIG. 2 is a flow chart depicting an embodiment of a method of establishing a secure time value in a connected device.
Figure 3:
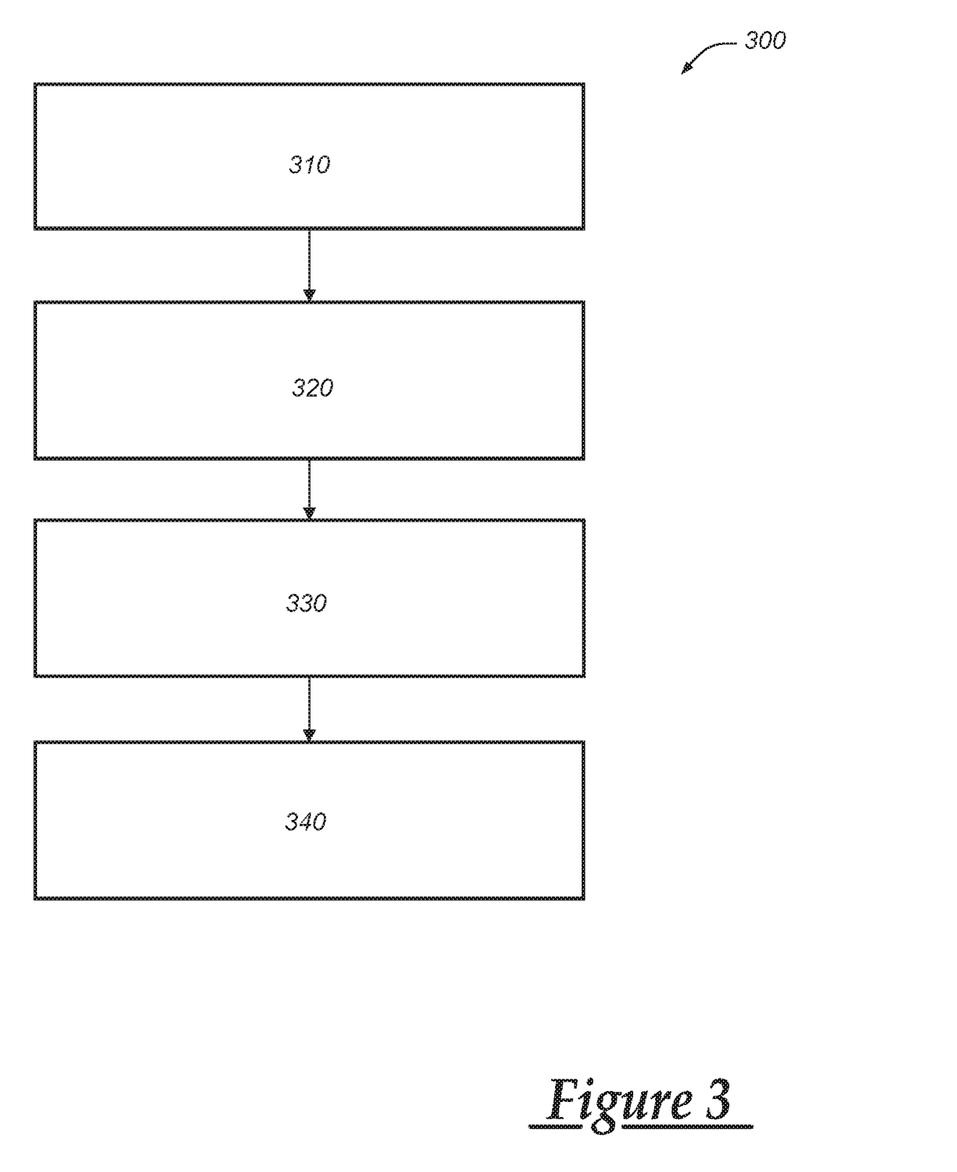
FIG. 3 is a flow chart depicting another embodiment of a method of establishing a secure time value in a connected device.

Turning now to FIG. 2, there is shown an embodiment of a method (200) of establishing a secure time value in a connected device. The connected device for methods 200 and 300 will be described with respect to the vehicle telematics unit 30. However, these methods could also be applied to other types of connected devices, such as the smart phone 57 or PC discussed above. The method 200 begins at step 210 by wirelessly receiving a tune value at the vehicle telematics unit 30 from an independent time server 92. The independent time server 92 (or other independent time servers) can be programmed to periodically transmit a time value to one or more vehicles. The independent time server 92 can wirelessly transmit a time value maintained at the server 92 to the vehicle telematics unit 30 via the wireless carrier system 14. The method 200 proceeds to step 220.

At step 220, it is determined whether the time value received from the independent time server 92 is earlier than a current time value maintained at the vehicle telematics unit 30. The vehicle telematics unit 30 can check the time counter it operates to determine the current time value. After the current time value maintained at the vehicle telematics unit 30 is determined, it can be compared to the time value received from the independent time server 92. The method 200 proceeds to step 230.

At step 230, the received time value is rejected when it is determined to be earlier than the current time value maintained at the vehicle telematics unit 30. However, the current time value at the vehicle can be replaced with the received time value when the received time value is determined to be the same as or later than the current time value maintained at the vehicle telematics unit 30. The vehicle telematics unit 30 can perform such a comparison to prevent the time value maintained at the vehicle 12 from being turned back without authorization. Some access to the vehicle 12 may be possible using digital certificates that have been certified by a trusted authority to be valid for a temporal period. Manipulation of the time value maintained at the vehicle 12 can significantly decrease the security of such digital certificates because the temporal aspect of the certificates has been rendered ineffective.

In this example, the vehicle telematics unit 30 can receive the time value from the independent time server 92 and determine it is the same or later than the time maintained at the vehicle 12. The vehicle telematics unit 30 can then adjust the time counter maintained by the vehicle telematics unit 30 based on the time value received from the independent time server 92. In some implementations, the vehicle telematics unit 30 can receive time values that are slightly earlier than the value maintained at the vehicle 12 and still conclude that the received time value is the "same" as the time value maintained at the vehicle 12. For instance, it is possible that the time value received from the independent time server 92 can precede the time value maintained at the vehicle 12 by as much as five minutes and still be considered the same such that the vehicle telematics unit 30 can adjust its time counter to reflect this five minute difference. The method 200 then ends.

Turning to FIG. 3, there is shown another embodiment of a method (300) of establishing a secure time value in the vehicle telematics unit 30. The method 300 begins by receiving at the vehicle telematics unit 30 one or more trusted digital certificates that are also stored at three or more trusted independent time servers remotely located from the vehicle telematics unit 30. The trusted digital certificates can be created by a source that is trusted by both the vehicle 12 and the independent time servers. In one implementation, this source can be a vehicle manufacturer that creates and maintains trusted digital certificates that are stored at both the vehicle 12 and the independent time servers. In this example, a plurality of time servers can exist in a federation that includes the independent time servers 92, 94 as well as independent time servers operated by the computer 18 and the call center 20. For this example, the federation includes four independent time servers but in general the federation can be a group of three or more independent time servers that each store trusted digital certificates, maintain a time value representing a current time, such as an epoch time value, and also maintain a list of the independent time servers in the federation.

Each of the independent time servers in the federation can receive and store the list that identifies all of the independent time servers included in the federation as well as the digital certificates. The combination of digital certificates and list of independent time servers can also be referred to as the pinset. The pinset can be provided to each of the independent time servers in the federation as well as the vehicle telematics unit 30 for it to perform certificate pinning. The vehicle telematics unit 30 can receive the pinset when the vehicle 12 is manufactured or the pinset can be securely remotely provided to the vehicle telematics unit 30 from a central facility, such as the computer 18. The pinset can also be sent from a unidirectionally communicating independent authority via the land network 16 to the independent time servers in the federation: independent time servers 92, 94 as well as the time servers maintained at the computer 18 and call center 20.

The vehicle telematics unit 30 can then request a time value from each of the independent time servers in the federation and can do so for any one of a number of reasons. In some implementations, the vehicle telematics unit 30 can detect that the time value received from the GPS module 40 is not synchronized with the time value maintained at the vehicle 12. Or in other implementations, a vehicle event can trigger the vehicle telematics unit 30 to request a time value from the federation. These vehicle events include a periodic time trigger, the initiation of a Wi-Fi or cellular connection, vehicle startup, or when the counter used to maintain the time value at the vehicle will reset itself. The vehicle telematics unit 30 can also request a time value from the federation whenever the unit 30 determines that the counter maintaining the time value at the vehicle 12 is reset. It is also possible to request a time value from the federation when the vehicle telematics unit 30 has detected that its time value has been tampered with. The method 300 proceeds to step 320.

At step 320, a time value and a hash of the pinset is received at the vehicle telematics unit 30. After receiving a request for a time value, the independent time servers 92, 94, the computer 18, and the call center 20 can select a digital certificate and access the pinset each of them store. A hash of the pinset can be created at the independent time servers 92, 94, the computer 18, and the call center 20 (i.e., the federation) and sent to the vehicle telematics unit 30 along with the selected digital certificates. The method 300 proceeds to step 330.

At step 330, the hash received from each of the plurality of independent time servers at the vehicle telematics unit 30 is verified using the pinset stored at the vehicle telematics unit 30. The vehicle telematics unit 30 can access the pinset it stores at the vehicle 12, which should be a copy of the pinset used by the independent time servers, and determine whether the digital certificates the vehicle 12 received are valid. The vehicle telematics unit 30 can identify whether the independent time servers in the federation are included in the pinset. This can be accomplished by validating the hashes received from each independent time server at the vehicle telematics unit 30 using its pinset. In addition, the vehicle telematics unit 30 can accept the median value returned from the aggregate of independent time servers in the federation. Any time values that are determined by statistical analysis to be an outlier when compared with the other time values can be deemed invalid. These statistical analysis techniques are known to those skilled in the art. A time value determined to be different from the median time value by a particular threshold can be rejected. It is possible for the threshold to be anywhere from an amount larger than 500 ms to 1 second or more. The method 300 proceeds to step 340.

At step 340, the vehicle telematics unit 30 determines which hashes received from the plurality of independent time servers are valid and accepts the time values received with the valid hashes. During normal operation, the hashes of the pinset sent from the federation of independent time servers can be received at and verified by the vehicle telematics unit 30. And the time values associated with those hashes may all be within one standard deviation of each other. When all of the hashes are verified, the vehicle telematics unit 30 can determine the average of the time values that were sent with the hashes and then update the time value maintained at the vehicle 12 with this determined time value.

However, sometimes the vehicle telematics unit 30 can determine that one or more of the hashes sent by independent time servers in the federation are not valid when compared to a hash created from the pinset stored at the vehicle 12. The vehicle telematics unit 30 can then decide whether or not it should trust the time values sent by the independent time servers in the federation that sent a validated hash even though some other servers in the federation were not validated. In some implementations, the vehicle telematics unit 30 can determine the number of independent time servers in the federation and then calculate the proportion of those independent time servers that have been validated. When the proportion of validated time servers in the federation is less than 50%, the vehicle telematics unit 30 can determine that none of the time values received from the federation should be trusted even from independent time servers sending hashes that can be validated. The vehicle telematics unit 30 can set up a test for making this determination where k equal the number of compromised time servers and n equals the total number of independent time servers in the federation. When the value of 2*k+1 is greater than n, the vehicle telematics unit 30 can ignore all of the time values received from the federation.

When the value of 2*k+1 is less than or equal to n, the vehicle telematics unit 30 can use the time values received from validated independent time servers in the federation and generate a trusted time from the validated time servers. It is possible for a centralized facility to periodically contact the independent time servers in the federation and monitor the time values those servers maintain. When the time servers maintain different times, the centralized facility can coordinate the time values maintained at all of the servers. But it should be understood that it is important to maintain an air gap with the independent time servers in the federation to preserve independence and prevent malicious attack. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a secure time value in a connected device, comprising the steps of:
   (a) receiving a hash of a pinset at the connected device from each of a plurality of independent time servers in a federation, wherein the pinset is stored at a memory of the connected device as well as at the independent time servers remotely located from the connected device;
   (b) receiving at the connected device a time value along with each hash of the pinset from each of the independent time servers, thereby providing multiple representations of time to the connected device, each of the multiple representations of time corresponding to one of the independent time servers;
   (c) attempting to verify the hashes of the pinset received from each of the plurality of independent time servers at the connected device;
   (d) determining at the connected device which time values received from the plurality of independent time servers are valid based on validity of the hashes;
   (e) determining the secure time value from the multiple representations of time by:
      (e1) rejecting the time values corresponding to hashes determined to be invalid; and
      (e2) determining the secure time value based upon the remaining one or more time values corresponding to the hashes determined to be valid; and
   (f) updating the connected device with the secured time value.

2. The method of claim 1, wherein the connected device further comprises a wireless device.

3. The method of claim 2, wherein the wireless device is a vehicle telematics unit.

4. The method of claim 2, wherein the wireless device is a smart phone.

5. The method of claim 1, wherein determining the secure time value further comprises creating a median time value using the remaining time values corresponding to the hashes determined to be valid and storing the median time value at the connected device.

6. The method of claim 1, further comprising the step of determining whether any one of the time values received from the plurality of independent time servers is different from the other time values based on statistical analysis and rejecting time values that are different by more than a threshold amount.

7. The method of claim 1, wherein a vehicle manufacturer generates one or more digital certificates included in the pinset.

8. The method of claim 1, further comprising rejecting the secure time value determined in step (e2) when at least one of the time values is determined to be valid based upon the validity of the associated hash, and a predetermined proportion of the multiple representations of time are determined to be invalid.

9. The method of claim 8, further comprising obtaining a validated time value from a validated independent time server, the validated independent time server separated from the plurality of independent time servers.

10. A method of establishing a secure time value in a connected device, comprising the steps of:
    (a) receiving a hash of a pinset at the connected device from each of a plurality of independent time servers in a federation, wherein the pinset is stored at a memory of the connected device as well as at the independent time servers remotely located from the connected device;
    (b) receiving at the connected device a time value along with each hash of the pinset from each of the independent time servers, thereby providing multiple representations of time to the connected device, each of the multiple representations of time corresponding to one of the independent time servers;
    (c) attempting to verify the hashes of the pinset received from each of the plurality of independent time servers at the connected device;
    (d) determining at the connected device which time values received from the plurality of independent time servers are valid based on validity of the hashes;
    (e) determining the secure time value from the multiple representations of time by:
       (e1) rejecting the time values corresponding to hashes determined to be invalid; and
       (e2) determining the secure time value based upon a plurality of remaining time values corresponding to the hashes determined to be valid; and
    (f) updating the connected device with the secured time value.

11. The method of claim 10, wherein the connected device further comprises a wireless device.

12. The method of claim 11, wherein the wireless device is a vehicle telematics unit.

13. The method of claim 11, wherein the wireless device is a smart phone.

14. The method of claim 10, wherein determining the secure time value further comprises creating a median time value using the remaining time values corresponding to the hashes determined to be valid and storing the median time value at the connected device.

15. The method of claim 10, further comprising the step of determining whether any one of the time values received from the plurality of independent time servers is different from the other time values based on statistical analysis and rejecting time values that are different by more than a threshold amount.

16. The method of claim 10, wherein a vehicle manufacturer generates one or more digital certificates included in the pinset.

17. The method of claim 10, further comprising rejecting the secure time value determined in step (e2) when at least one of the time values is determined to be valid based upon the validity of the associated hash, and a predetermined proportion of the multiple representations of time are determined to be invalid.

18. The method of claim 17, further comprising obtaining a validated time value from a validated independent time server, the validated independent time server separated from the plurality of independent time servers.

* * * * *